No. 888,302. PATENTED MAY 19, 1908.
F. N. BOUGHN.
WHEEL TIRE.
APPLICATION FILED OCT. 29, 1907.
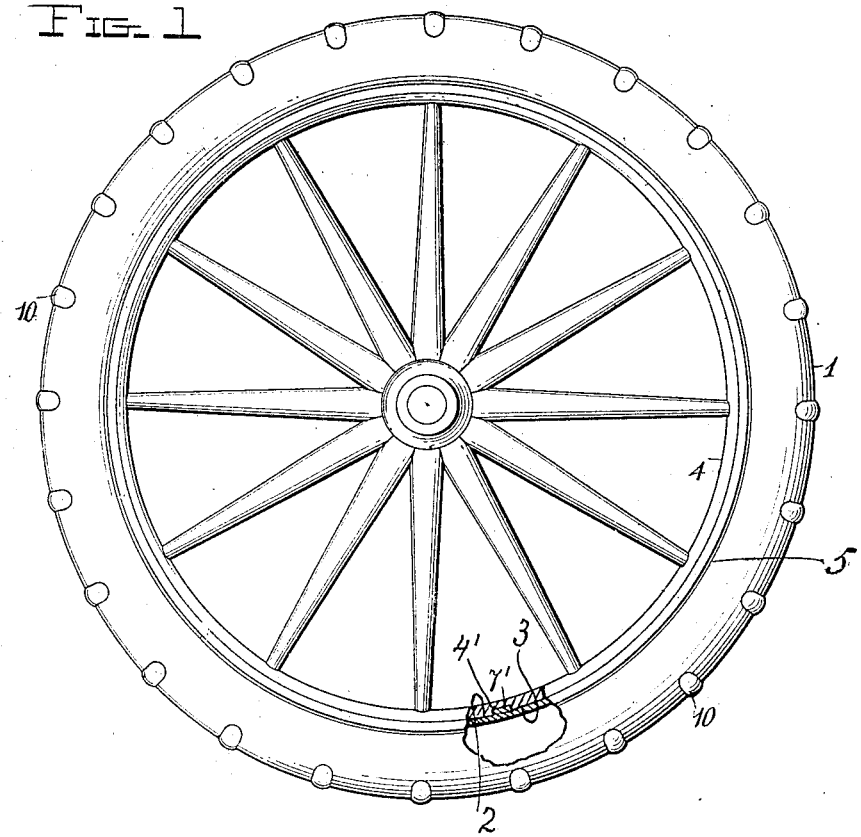
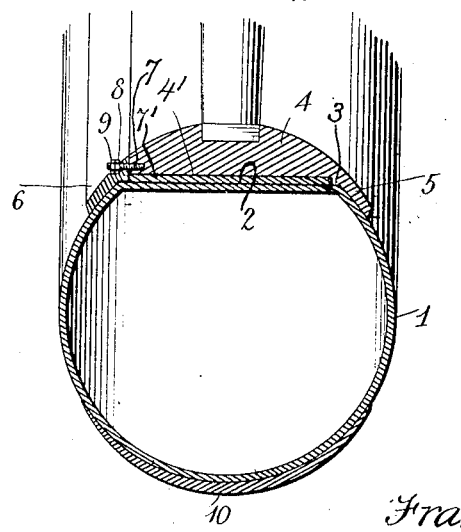
Witnesses
Inventor
Frank N. Boughn
By Victor J. Evans
Attorney

UNITED STATES PATENT OFFICE.

FRANK N. BOUGHN, OF RIVERSIDE, CALIFORNIA.

WHEEL-TIRE.

No. 888,302.

Specification of Letters Patent.

Patented May 19, 1908.

Application filed October 29, 1907. Serial No. 399,660.

*To all whom it may concern:*

Be it known that I, FRANK N. BOUGHN, a citizen of the United States, residing at Riverside, in the county of Riverside and State of California, have invented new and useful Improvements in Wheel-Tires, of which the following is a specification.

This invention relates to tires for automobiles, bicycles, buggies and other vehicles; and it has for its object to provide a metallic tire which shall be light, resilient, non-slipping and practically puncture proof; other objects being to simplify and improve the general construction of the tire and a means for securing the same in position upon the rim of a vehicle wheel.

With these and other ends in view which will readily appear as the nature of the invention is better understood, the same consists in the improved construction and novel arrangement and combination of parts which will be hereinafter fully described and particularly pointed out in the claims.

In the accompanying drawing has been illusrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a side view of a wheel equipped with the improved tire. Fig. 2 is a transverse sectional view, enlarged, taken through the rim of the wheel and the tire.

Corresponding parts in both figures are denoted by like characters of reference.

The improved tire consists of a tube 1 which may be made of any suitable metal, said tubular tire being made of any desired dimensions and of annular shape to fit a wheel of the desired size. The manner or method of manufacturing the tire does not constitute a part of the present invention. The tube constituting the tire is preferably made of approximately circular cross-section but with a flattened inner side face 2 adapted to be seated upon the correspondingly flattened exterior surface 3 of the rim 4 of the wheel to which it is applied. The wheel may be of any desired construction and may be made of wood, metal or any other suitable material or combinations of materials, the rim 4 being provided with one or more transverse grooves or recesses, one of which appears at 4' in Fig. 1 of the drawings, for the accommodation of a lug 7', which is brazed or otherwise secured upon the flat inner face 2 of the tire, for the purpose of preventing the latter from slipping or creeping when applied in position for operation.

The rim 4 of the wheel is provided along on of its side edges with a flange 5 directly engaging one side of the tubular tire 1 when the latter is placed in position upon the wheel rim; suitably secured upon the opposite side or edge of the rim is an annular flange 6 consisting of a ring of metal or other suitable material; the latter being preferably held in position, detachably, by means of bolts 7 threaded into the rim 4 and provided with tightening nuts 8 and lock nuts 9.

The tubular tire is provided upon its outer, or bearing face, with transverse lugs or projections 10, brazed or otherwise suitably secured thereupon and disposed at suitable intervals; said lugs serving by engagement with the surface of the ground to prevent the wheel from slipping, thus greatly increasing the efficiency of the tire.

From the foregoing description taken in connection with the drawings hereto annexed, the operation and advantages of this invention will be readily understood. The construction of the improved tire is simple and inexpensive; being made of metal it is practically puncture proof; and the metal employed in the manufacture of the tire being preferably of a resilient nature, it follows that the tire itself possesses a considerable degree of inherent resiliency which insures easy riding. The tire may be very readily applied to the vehicle wheel where it is firmly secured by means of the detachable ring or flange 6; and the construction is such as to enable the parts to be very readily disassembled or reassembled as may be required. It is evident that the hollow or tubular metallic tire of the present invention may be filled with air, or other fluid, under pressure, thus enabling comparatively thin, light and inexpensive material to be used in the construction thereof, without danger of collapsing; it is also desired to state that the anti-slipping projections or lugs 10—10, may, within the scope of the invention, be formed upon a separate strip or band, which latter may be shrunk or otherwise secured in position upon the tire proper. When the latter construction is resorted to, the said anti-slipping lugs may be in the nature of corrugations, stamped or formed upon such annular band.

Having thus fully described the invention, what is claimed as new is:—

A vehicle wheel having a rim provided with a flattened tread surface and provided at one side of said surface with an integral annular flange, the said tread surface being formed at intervals with transverse grooves, a metallic tire having a flattened base resting against said flattened tread surface, said tire being engaged at one side by said flange, transverse ribs upon the flattened surface of the tire engaging the grooves in the rim, and a removable retaining flange at the opposite side of the rim engaging the opposite side of the tire and engaging and holding said ribs seated in the grooves.

In testimony whereof I affix my signature in presence of two witnesses.

FRANK N. BOUGHN.

Witnesses:
EDWIN C. SEARES,
F. A. POMEROY.